(12) United States Patent
Matsui et al.

(10) Patent No.: US 11,378,382 B2
(45) Date of Patent: Jul. 5, 2022

(54) LIGHT DETECTION DEVICE AND LIGHT DETECTION METHOD

(71) Applicant: HAMAMATSU PHOTONICS K.K., Hamamatsu (JP)

(72) Inventors: Yoshinori Matsui, Hamamatsu (JP); Yukinobu Sugiyama, Hamamatsu (JP); Munenori Takumi, Hamamatsu (JP); Haruyoshi Toyoda, Hamamatsu (JP); Kazutaka Suzuki, Hamamatsu (JP); Kazuhiro Nakamura, Hamamatsu (JP); Keisuke Uchida, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 0 days.

(21) Appl. No.: 16/976,911

(22) PCT Filed: Dec. 25, 2018

(86) PCT No.: PCT/JP2018/047626
§ 371 (c)(1),
(2) Date: Aug. 31, 2020

(87) PCT Pub. No.: WO2019/171716
PCT Pub. Date: Sep. 12, 2019

(65) Prior Publication Data
US 2021/0041221 A1 Feb. 11, 2021

(30) Foreign Application Priority Data
Mar. 8, 2018 (JP) .............................. JP2018-041782

(51) Int. Cl.
*G01B 11/00* (2006.01)
(52) U.S. Cl.
CPC ................................ *G01B 11/002* (2013.01)

(58) Field of Classification Search
CPC ...... G06F 3/042; G06F 3/0421; G06F 3/0425; G01B 11/002
See application file for complete search history.

(56) References Cited

U.S. PATENT DOCUMENTS

2004/0195490 A1* 10/2004 Sugiyama .............. H04N 5/335
250/208.1
2014/0022168 A1* 1/2014 Kao ...................... G06F 3/0386
345/157

FOREIGN PATENT DOCUMENTS

| CN | 1605189 A | 4/2005 |
| CN | 100394606 | 6/2008 |

(Continued)

OTHER PUBLICATIONS

International Preliminary Report on Patentability dated Sep. 17, 2020 for PCT/JP2018/047626.

*Primary Examiner* — Thanh Luu
(74) *Attorney, Agent, or Firm* — Faegre Drinker Biddle & Reath LLP

(57) ABSTRACT

A plurality of pixels are arranged two-dimensionally in a matrix and individually include a first photosensitive portion and a second photosensitive portion. A plurality of first wirings connect a plurality of first photosensitive portions to each other for every row. A plurality of second wirings connect a plurality of second photosensitive portions to each other for every column. A first reading unit is arranged to read signal data through at least some of the plurality of first wirings. A second reading unit is arranged to read signal data through at least some of the plurality of second wirings. The first reading unit has a reading pixel setting unit arranged to set, based on signal data read in the first frame, a pixel group for reading signal data in a second frame subsequent to a first frame from the plurality of pixels.

9 Claims, 13 Drawing Sheets

(56) References Cited

FOREIGN PATENT DOCUMENTS

| CN | 101926163 A | 12/2010 |
|----|-------------|---------|
| JP | 2005-323190 A | 11/2005 |
| JP | 4351057 B2 | 10/2009 |
| TW | 201735406 A | 10/2017 |
| WO | WO-03/049190 A1 | 6/2003 |

* cited by examiner

LIGHT DETECTION DEVICE AND LIGHT DETECTION METHOD

TECHNICAL FIELD

The present invention relates to a light detection device and a light detection method.

BACKGROUND ART

Known light detection devices include a plurality of pixels (Patent Literature 1). The plurality of pixels are arranged two-dimensionally in a matrix. Each of the plurality of pixels has a pair of photosensitive portions. One of each of the pairs of photosensitive portions for every row is connected to each other through first circuits. The other of each of the pairs of photosensitive portions for every column is connected to each other through second circuits. Signal data projected in the row direction is read from the first circuits. Signal data projected in the column direction is read from the second circuits.

CITATION LIST

Patent Literature

[Patent Literature 1] PCT International Publication No. WO2003/049190

SUMMARY OF INVENTION

Technical Problem

The known light detection device described above has a structure with a light receiving unit in which each of a plurality of pixels that are two-dimensionally arranged has a pair of photosensitive portions. One of each of the pairs of photosensitive portions for every row is connected to each other through first wirings. Similarly, the other of each of the pairs of photosensitive portions for every column is connected to each other in each column through second wirings. An output data amount in a structure with this light receiving unit is similar to that in the case in which two one-dimensional sensors having a plurality of pixels are combined. For this reason, the foregoing light detection device has a smaller output data amount than the output data amount of a general two-dimensional sensor. Due to this structure, a two-dimensional position of a spot of light incident on a light receiving unit can be detected quickly. In virtue of this characteristic, the foregoing light detection device is used in many instruments for detecting a moving body in surveying instruments, positioning in printers, and the like. In the market, it is required to further increase detection speed of the light detection device described above.

In the light detection device described above, signal data in each of the pixels connected to each of the first wirings and the second wirings is read. When the number of pixels performing reading is increased, a resolution in detecting a position of the incident light spot becomes higher. For this reason, although the position detection accuracy in detecting a position of the incident light spot, that is, the degree of accuracy in detecting an incident position of the incident light spot is improved, reading speed decreases. Meanwhile, when the number of pixels performing reading is reduced, reading speed is improved. In this case, due to deterioration in resolution in detecting a position of the incident light spot, the position detection accuracy in detecting a position of the incident light spot deteriorates.

An object of a first aspect of the present invention is to provide a light detection device in which detection speed can be improved and position detection accuracy in detecting a position of an incident light spot, that is, a degree of accuracy in detecting an incident position of an incident light spot is ensured. An object of a second aspect of the present invention is to provide a light detection method in which detection speed can be improved and position detection accuracy in detecting a position of an incident light spot, that is, a degree of accuracy in detecting an incident position of an incident light spot is ensured.

Solution to Problem

According to a first aspect of the present invention, there is provided a light detection device detecting an incident position of light. This light detection device includes a plurality of pixels, a plurality of first wirings, a plurality of second wirings, a first reading unit, and a second reading unit. The plurality of pixels are arranged two-dimensionally in a matrix and individually include a first photosensitive portion and a second photosensitive portion. The plurality of first wirings connect a plurality of the first photosensitive portions to each other for every row. The plurality of second wirings connect a plurality of the second photosensitive portions to each other for every column. The first reading unit is arranged to read signal data through at least some of the plurality of first wirings. The second reading unit is arranged to read signal data through at least some of the plurality of second wirings. The first reading unit has a reading pixel setting unit arranged to set, based on signal data read in the first frame, a pixel group for reading signal data in a second frame subsequent to a first frame from the plurality of pixels.

In this first aspect, the reading pixel setting unit is arranged to set a pixel group for reading signal data in the second frame from the plurality of pixels based on the signal data read in the first frame. For this reason, for example, in the first reading unit, in the second frame, a pixel group suitable for detecting an incident position of light is selected from the plurality of pixels based on the signal data read in the first frame, and signal data is read. In this case, a pixel group to be read in the second frame is set based on the signal data read in the first frame. Therefore, even if the number of pixels reading signal data is reduced, the position detection accuracy in detecting a position of an incident light spot, that is, the degree of accuracy in detecting an incident position of an incident light spot is maintained. That is, while the position detection accuracy in detecting a position of an incident light spot is maintained, the number of pixels reading can be reduced. If the number of pixels reading is reduced, speed of detecting an incident position of a light spot can be improved. Therefore, both ensuring the position detection accuracy in detecting a position of an incident light spot and improving speed of detecting a position can be achieved.

In this first aspect, the reading pixel setting unit may be arranged to set a pixel group for reading signal data in the first frame to a first pixel group of the plurality of pixels, and may be arranged to set, based on the signal data read in the first frame, the pixel group for reading signal data in the second frame to a second pixel group connected to some first wirings of the plurality of first wirings connected to the first pixel group. In this case, the second pixel group is determined based on the signal data in the first frame in which the pixels perform reading from the first pixel group configured to be a region larger than the second pixel group for reading signal data in the second frame. Therefore, even when the number of pixels reading is reduced, the position detection accuracy in detecting a position of an incident light spot is ensured.

In this first aspect, the reading pixel setting unit may have a dividing unit, a comparison unit, and a determination unit. The dividing unit may be arranged to divide the pixel group for reading signal data in the second frame into a plurality of groups by partitioning regions in which the plurality of pixels are arranged. The comparison unit may be arranged to compare signal data read from each of the groups between the groups divided off by the dividing unit. The determination unit may be arranged to determine the pixel group for reading signal data in the second frame, based on comparison results of the comparison unit. In this case, the pixel group for reading signal data in the second frame is determined based on comparison results between the divided groups. For this reason, compared to when signal data read from the plurality of first wirings is used for determining a pixel group as it stands without partitioning a region, the pixel group is changed easily and quickly.

In this first aspect, the first reading unit may have a binning reading unit arranged to read signal data by compiling information of signals output from the plurality of first wirings in each of the groups into one signal for each of the groups divided off by the dividing unit. The comparison unit may be arranged to compare signal data read by the binning reading unit between the groups. In this case, binning reading in which pieces of signal data output from the plurality of first wirings for each of the groups are collectively read as one piece of signal data is performed. Accordingly, while information of each piece of signal data output from the plurality of first wirings is reflected, reading speed is improved compared to when each piece of signal data output from the plurality of first wirings is individually read.

In this first aspect, the dividing unit may be arranged to divide the pixel group for reading signal data in the second frame into a plurality of groups, based on comparison results of the comparison unit. In this case, a position of dividing off a pixel group is changed easily and quickly compared to when each piece of signal data read from the plurality of first wirings is individually used for grouping. Accordingly, even when the incident position of a light spot moves, the position of dividing off a pixel group is suitably changed conforming to the movement thereof. Therefore, signal data of each of the groups is compared easily and accurately.

In this first aspect, the dividing unit may be arranged to divide the pixel group for reading signal data in the second frame into a plurality of groups, based on an amount of change over time in a comparison value obtained through comparison by the comparison unit. The determination unit may be arranged to determine the pixel group for reading signal data in the second frame, based on the amount of change over time. According to this configuration, compared to when signal data read from the plurality of first wirings and the plurality of second wirings is used as it stands, the position of dividing off a pixel group and the pixel group for reading signal data can be changed easily and quickly. If the position of dividing off a pixel group is suitably changed conforming to the movement of the incident position of a light spot, signal data of each of the groups is compared easily and accurately. If the pixel group for reading signal data is suitably changed conforming to the movement of the incident position of a light spot, the position detection accuracy in detecting a position of an incident light spot can be improved.

In this first aspect, the dividing unit may be arranged to divide the pixel group for reading signal data in the second frame into a plurality of groups when the comparison value obtained through comparison by the comparison unit or the amount of change over time in the comparison value exceeds a predetermined value. In this case, since grouping of a pixel group can be performed at an appropriate timing in accordance with setting of a predetermined value, a frequency of grouping can be reduced. If the frequency of grouping performed by the dividing unit is reduced, speed of detecting an incident position of an incident light spot can be improved.

In this first aspect, the determination unit may be arranged to determine a pixel group different from a pixel group reading signal data in a preceding frame of the second frame as the pixel group for reading signal data in the second frame when the comparison value obtained through comparison by the comparison unit or the amount of change over time in the comparison value exceeds a predetermined value. In this case, the pixel group for reading signal data can be changed at an appropriate timing in accordance with setting of a predetermined value. Therefore, while the position detection accuracy in detecting a position of an incident light spot is ensured, the frequency of grouping can be reduced. If the frequency of grouping performed by the dividing unit is reduced, speed of detecting an incident position of an incident light spot can be improved.

In this first aspect, the reading pixel setting unit may further have a computation unit arranged to compute a centroid position of projection data in a row direction or a column direction of signals output through at least some of the plurality of first wirings. The dividing unit may be arranged to divide the pixel group for reading signal data in the second frame into a plurality of groups by partitioning, based on the centroid position computed by the computation unit, regions in which the plurality of pixels are arranged. The determination unit may be arranged to determine a pixel group to be set as the pixel group for reading signal data in the second frame, based on the centroid position computed by the computation unit. In this case, since grouping is performed based on the centroid position, signal data between groups can be easily compared.

According to a second aspect of the present invention, there is provided a light detection method for detecting a two-dimensional incident position of light using a light detection device. The light detection device includes a plurality of pixels, a plurality of first wirings, a plurality of second wirings, a first reading unit, and a second reading unit. The plurality of pixels are arranged two-dimensionally in a matrix and individually include a first photosensitive portion and a second photosensitive portion. The plurality of first wirings connect a plurality of the first photosensitive portions to each other for every row. The plurality of second wirings connect a plurality of the second photosensitive portions to each other for every column. This light detection method includes reading signal data projected in a row direction from signals output through at least some of the plurality of first wirings, reading signal data projected in a column direction from signals output through at least some of the plurality of second wirings, and detecting a two-dimensional incident position of light from two pieces of the read signal data. The two pieces of signal data are read through at least some of the plurality of first wirings in a plurality of frames. A pixel group for reading signal data in a second frame subsequent to a first frame is set from the plurality of pixels based on signal data read in the first frame.

In this second aspect, a pixel group for reading signal data in the second frame subsequent to the first frame is set from the plurality of pixels based on signal data read through a reading step in the first frame. For this reason, signal data can be read in the second frame from a pixel group, of the plurality of pixels, suitable for detecting an incident position of light based on the signal data read in the first frame. In this case, a pixel group to be read is set based on the signal data read in the first frame. Therefore, even if the number of pixels reading signal data is reduced, the position detection accuracy in detecting a position of an incident light spot, that is, the degree of accuracy in detecting an incident position of an incident light spot is ensured. If the number of pixels reading is reduced, speed of detecting a position of an incident light spot is improved.

Advantageous Effects of Invention

According to the first aspect of the present invention, it is possible to provide a light detection device in which speed of detecting an incident position is improved and the position detection accuracy in detecting a position of an incident light spot, that is, the accuracy in detecting an incident position of an incident light spot is ensured in detecting an incident position of light. According to the second aspect of the present invention, it is possible to provide a light detection method in which speed of detecting an incident position is improved and the position detection accuracy in detecting a position of an incident light spot is ensured in detecting an incident position of light.

DESCRIPTION OF EMBODIMENT

Hereinafter, with reference to the accompanying drawings, an embodiment of the present invention will be described in detail. In the description, the same reference signs are used for the same elements or elements having the same function, and duplicate description will be omitted.

Figure 1:
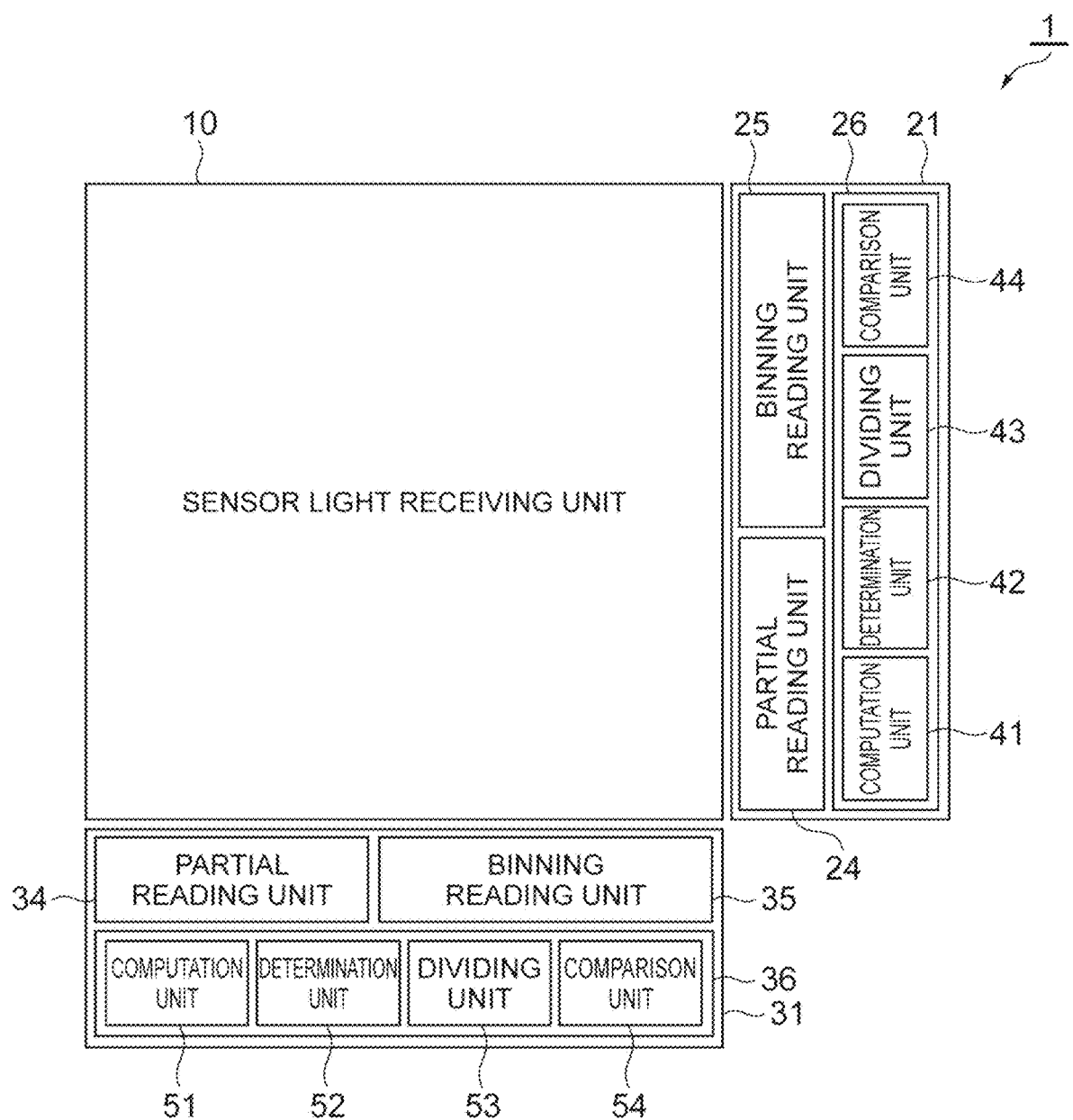
FIG. 1 is a block diagram of a light detection device according to an embodiment.
Figure 2:
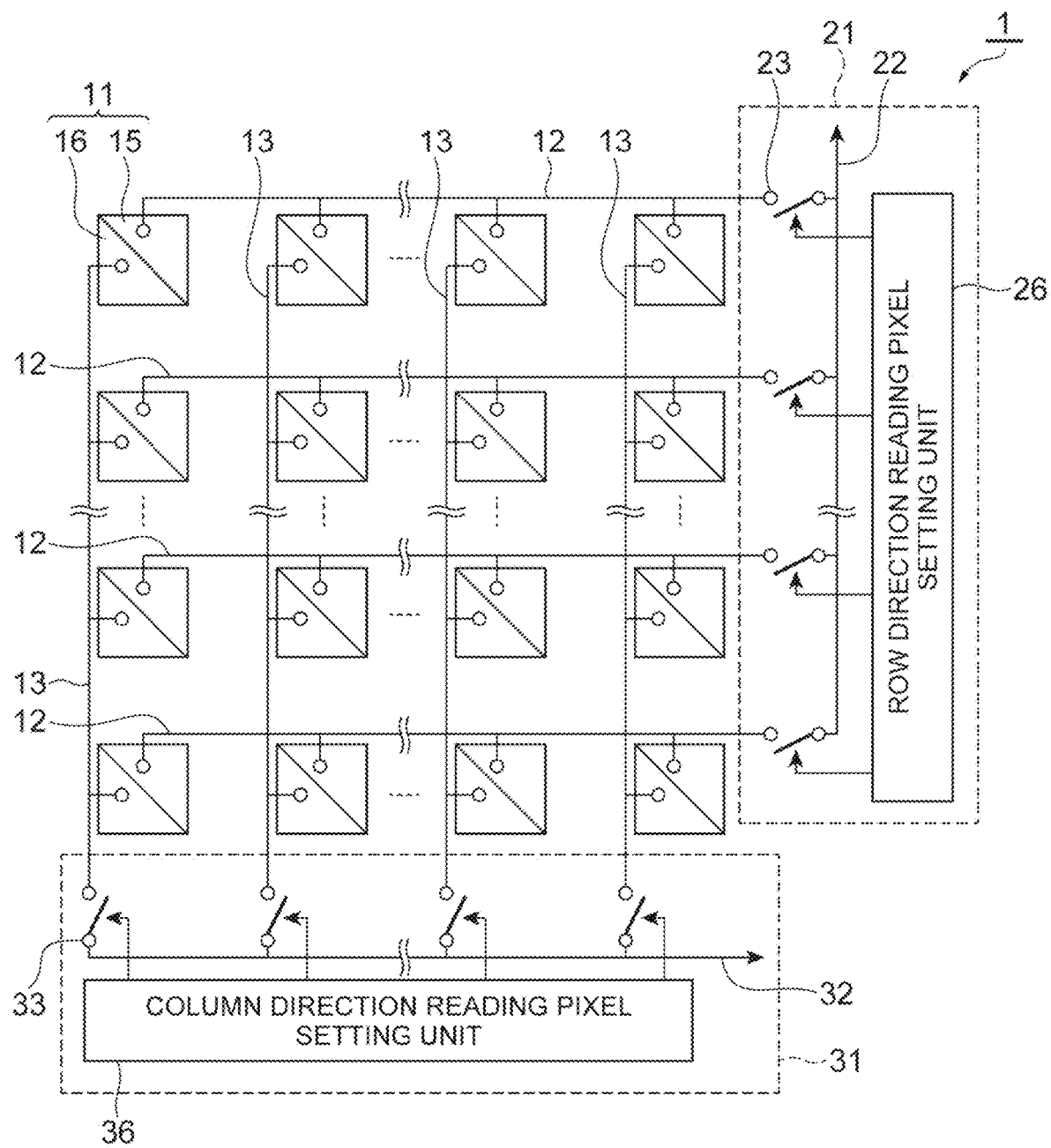
FIG. 2 is a schematic circuit diagram of the light detection device.
Figure 3:
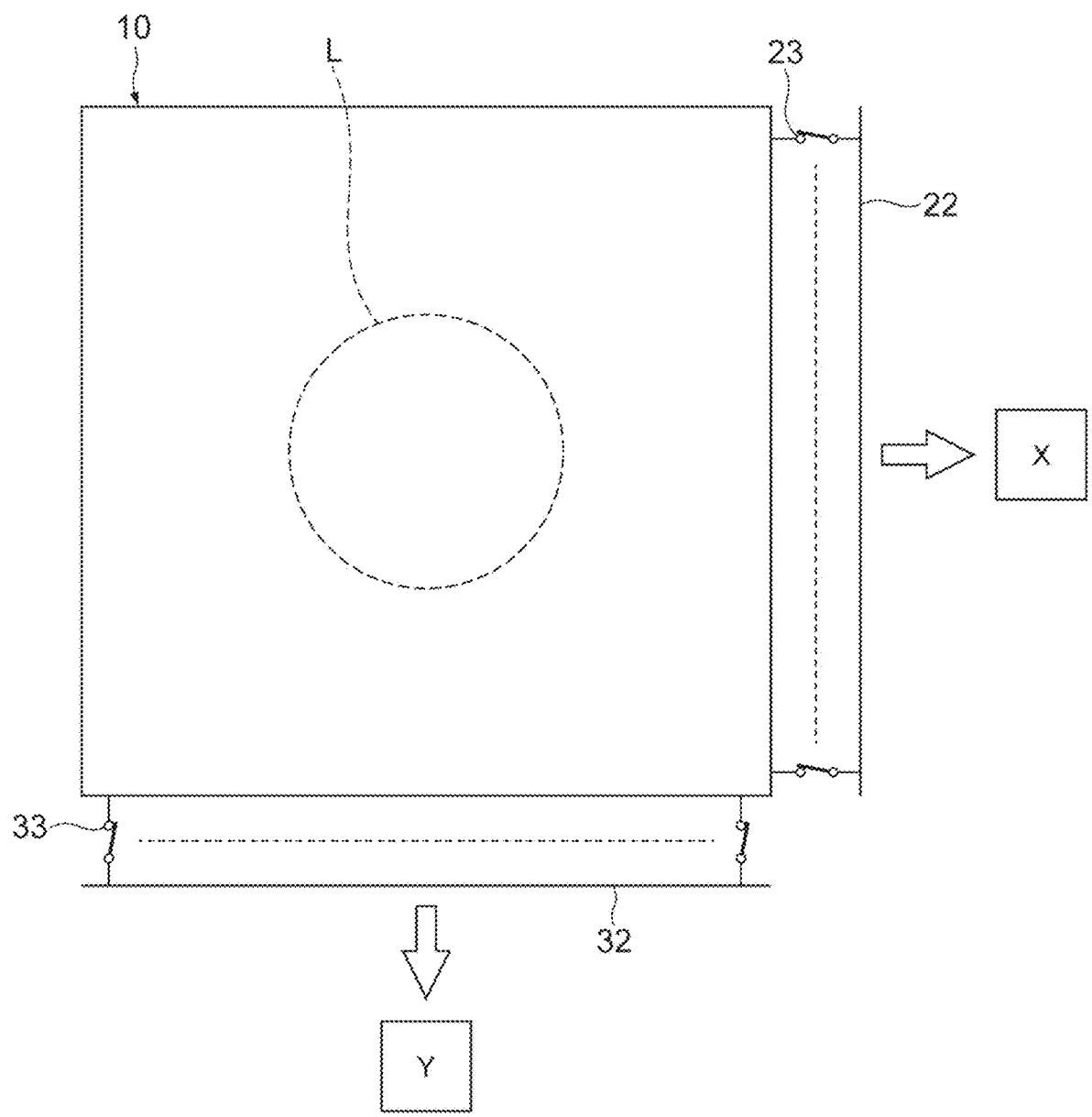
FIG. 3 is a view illustrating the light detection device reading signal data.
Figure 4:
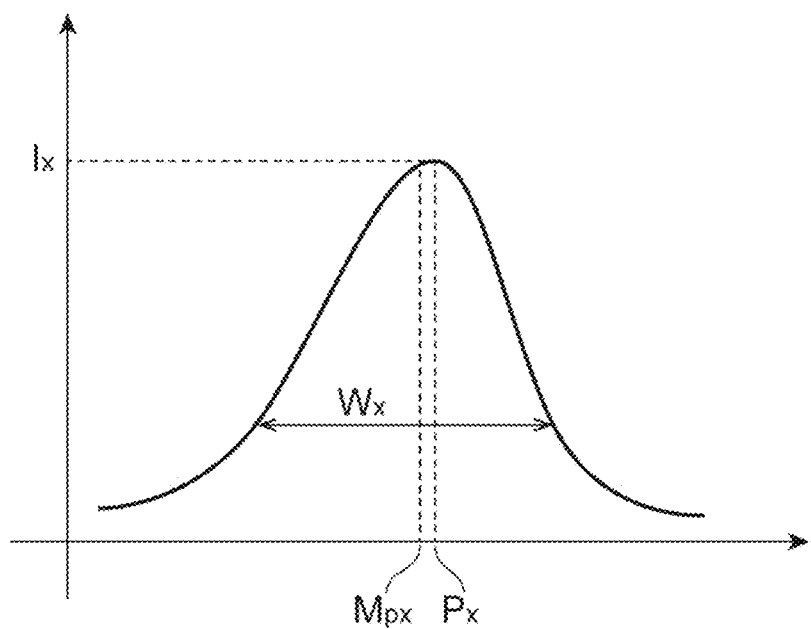
FIG. 4 is a view illustrating a brightness distribution of signal data projected in a row direction.
Figure 5:
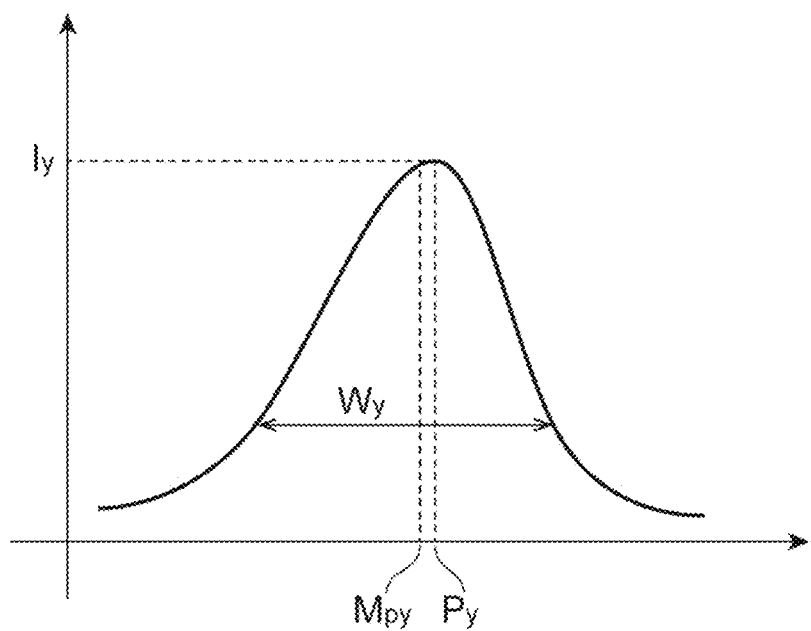
FIG. 5 is a view illustrating a brightness distribution of signal data projected in a column direction.

First, with reference to FIGS. 1 to 5, the entire configuration of a light detection device according to the present embodiment will be described. FIG. 1 is a block diagram of the light detection device according to the present embodiment. FIG. 2 is a schematic circuit diagram of the light detection device according to the present embodiment. FIG. 3 is a view for describing the light detection device reading signal data. FIGS. 4 and 5 are views illustrating signal data read by the light detection device.

A light detection device 1 is a profile sensor for detecting a two-dimensional incident position of light and reads a signal generated due to incident light as two-dimensional projection data corresponding to an incident position, that is, a two-dimensional profile. In the present embodiment, the light detection device 1 continuously detects the incident position of a spot of light in a plurality of frames. Here, "a frame" denotes a period of one light detection performed by the light detection device 1.

The light detection device 1 includes a sensor light receiving unit 10, a row direction reading unit 21, and a column direction reading unit 31. For example, the row direction reading unit 21 is a first reading unit, and the column direction reading unit 31 is a second reading unit. Projection data of a signal generated when light of a light spot is received by the sensor light receiving unit 10 is read by each of the row direction reading unit 21 and the column direction reading unit 31. As illustrated in FIG. 2, the sensor light receiving unit 10 has a plurality of pixels 11, a plurality of wirings 12 connecting the plurality of pixels 11 to the row direction reading unit 21, and a plurality of wirings 13 connecting the plurality of pixels 11 to the column direction reading unit 31. For example, the plurality of wirings 12 is a plurality of first wirings, and the plurality of wirings 13 is a plurality of second wirings.

The plurality of pixels 11 are arranged two-dimensionally in a matrix. Here, "a matrix" also includes a two-dimensional closest packing pattern such as a honeycomb pattern. Each of the plurality of pixels 11 includes a photosensitive portion 15 and a photosensitive portion 16. Each of the photosensitive portions 15 and 16 includes a light receiving element such as a photodiode. Each of the photosensitive portions 15 and 16 may include a plurality of light receiving elements. For example, when the photosensitive portions 15 are included in first photosensitive portions, the photosensitive portion 16 are included in second photosensitive portions.

The photosensitive portion 15 and the photosensitive portion 16 included in the same pixel 11 are adjacent to each other when viewed in a direction orthogonal to a row direction and a column direction. That is, in the sensor light receiving unit 10, a plurality of photosensitive portions 15 and a plurality of photosensitive portions 16 are arranged in the row direction and the column direction in each of the pixels 11.

The plurality of wirings 12 connect the plurality of photosensitive portions 15 to each other in each row. Each of the wirings 12 extends in the row direction and connects the plurality of photosensitive portions 15 arranged in one line in the row direction to each other. The wirings 12 may respectively include a plurality of switching elements provided in a manner of corresponding to the photosensitive portions 15. In this case, the plurality of photosensitive portions 15 arranged in one line in the row direction are electrically connected to each other when the plurality of switching elements are turned on in the respective wirings 12.

The plurality of wirings 13 connect the plurality of photosensitive portions 16 to each other in each column. Each of the wirings 13 extends in the column direction and electrically connects the plurality of photosensitive portions 16 arranged in one line in the column direction to each other. The wirings 13 may respectively include a plurality of switching elements provided in a manner of corresponding to the photosensitive portions 16. In this case, the plurality of photosensitive portions 16 arranged in one line in the column direction are electrically connected to each other when the plurality of switching elements are turned on in the respective wirings 13.

The row direction reading unit 21 and the column direction reading unit 31 are constituted of a register, a memory, a comparator, a computation unit, a multiplexer, a selector, and an A/D converter constituted of various kinds of logic circuits such as AND/OR/NOT/XOR gates; and hardware including a power source control circuit and the like. Moreover, some or the entireties of the row direction reading unit 21 and the column direction reading unit 31 may be constituted of an integrated circuit such as an application specific integrated circuit (ASIC) or a field programmable gate array (FPGA). The row direction reading unit 21 and the column direction reading unit 31 are controlled and operated in accordance with a built-in control program, an external control program, various kinds of control signals, or the like.

The row direction reading unit 21 further has a first output line 22 outputting signals from the plurality of photosensitive portions 15 to the outside and a plurality of switching elements 23 switching the connection state between each of the wirings 12 and the first output line 22. The plurality of switching elements 23 are provided between the respective wirings 12 and the first output line 22. When the switching elements 23 are turned on, the wirings 12 connected to the turned-on switching elements 23 and the first output line 22 are electrically connected to each other. The row direction reading unit 21 reads signal data through at least some of the plurality of wirings 12 by controlling the plurality of switching elements 23.

For example, as illustrated in FIG. 3, the row direction reading unit 21 reads signal data X from the plurality of photosensitive portions 15 through the plurality of wirings 12. The signal data X is signal data projected in the row direction, and outputs from the plurality of photosensitive portions 15 connected to each other through the same wiring 12 are summed therein. Signal data projected in the row direction is also referred to as a row direction profile, for example. FIG. 4 illustrates the signal data X read by the row direction reading unit 21. The vertical axis illustrates a brightness in the signal data X, and the horizontal axis illustrates a position of the pixel 11, which has output a signal, in the column direction.

The column direction reading unit 31 further has a second output line 32 outputting signals from the plurality of photosensitive portions 16 to the outside and a plurality of switching elements 33 switching the connection state between each of the wirings 13 and the second output line 32. The plurality of switching elements 33 are provided between the respective wirings 13 and the second output line 32. When the switching elements 33 are turned on, the wirings 13 connected to the turned-on switching elements 33 and the second output line 32 are electrically connected to each other. The column direction reading unit 31 reads signal data through at least some of the plurality of wirings 13 by controlling the plurality of switching elements 33.

For example, as illustrated in FIG. 3, the column direction reading unit 31 reads signal data Y from the plurality of photosensitive portions 16 through the plurality of wirings 13. The signal data Y is signal data projected in the column direction, and outputs from the plurality of photosensitive portions 16 connected to each other through the same wiring 13 are summed therein. Signal data projected in the column direction is also referred to as a column direction profile, for example. FIG. 5 illustrates the signal data Y read by the column direction reading unit 31. The vertical axis illustrates a brightness in the signal data Y, and the horizontal axis illustrates a position of the pixel 11, which has output a signal, in the row direction.

Next, functional blocks of the row direction reading unit 21 and the column direction reading unit 31 will be described in detail. As illustrated in FIG. 1, the row direction reading unit 21 has a partial reading unit 24, a binning reading unit 25, and a row direction reading pixel setting unit 26. The column direction reading unit 31 has a partial reading unit 34, a binning reading unit 35, and a column direction reading pixel setting unit 36.

The partial reading units 24 and 34 perform partial reading in which signal data is read from only some of the pixels 11 set by the row direction reading pixel setting unit 26 and the column direction reading pixel setting unit 36, among all the pixels 11 constituting the sensor light receiving unit 10. Partial reading may be performed in the pixels 11 arranged in a region set in advance among the sensor light receiving unit 10, or may be performed in the pixels 11 in which a brightness equal to or higher than a predetermined threshold is detected among the sensor light receiving unit 10. For example, this predetermined threshold may be a value obtained from feature amounts such as a detected brightness, a peak position, and a signal data width, that is, a profile width, or may be an arbitrary value set by a user. In the present embodiment, the partial reading unit 24 reads signals through only the wirings 12 connected to a pixel group set by the row direction reading pixel setting unit 26. The partial reading unit 34 reads signals through only the wirings 13 connected to a pixel group set by the column direction reading pixel setting unit 36.

The binning reading units 25 and 35 read signal data through binning reading from the pixels 11 arranged in a region set in advance or in a region set by the row direction reading pixel setting unit 26 and the column direction reading pixel setting unit 36, that is, pixel group. In the present embodiment, as one piece of signal data, the binning reading unit 25 collectively reads a plurality of pieces of signal data output from a predetermined number of wirings 12 disposed adjacent to each other. As one piece of signal data, the binning reading unit 35 collectively reads a plurality of pieces of signal data output from a predetermined number of wirings 13 disposed adjacent to each other.

Using an adding circuit, the binning reading units 25 and 35 may collectively read, as one piece of signal data described above, sums, an average value of the sums, a logical sum, a median value, or the like of signal data output from the plurality of wirings 12 and the plurality of wirings 13 or may collectively read, as one piece of signal data described above, values obtained from the feature amounts such as the peak values, the peak positions, the profile widths, and the like in signal data, that is, profile data in which a signal output from the plurality of wirings 12 or the plurality of wirings 13 is projected.

The row direction reading pixel setting unit 26 and the column direction reading pixel setting unit 36 set a pixel group for reading signal data from the plurality of pixels 11. In the present embodiment, the foregoing pixel group set by the row direction reading pixel setting unit 26 and the column direction reading pixel setting unit 36 are arranged in one continuous region. The row direction reading pixel setting unit 26 turns on the switching elements 23 connected to the wirings 12 reading signal data. That is, the row direction reading pixel setting unit 26 sets a pixel group for reading signal data through the wirings 12 by electrically connecting the first output line 22 and the wirings 12 to each other. The column direction reading pixel setting unit 36 turns on the switching elements 33 connected to the wirings 13 reading signal data. That is, the column direction reading pixel setting unit 36 sets a pixel group for reading signal data through the wirings 13 by electrically connecting the second output line 32 and the wirings 13 to each other.

The row direction reading pixel setting unit 26 and the column direction reading pixel setting unit 36 set, from the plurality of pixels 11, a pixel group for reading signal data in a second frame subsequent to a first frame based on signal data read in the first frame. Here, similar to "a frame" as described above, "a first frame" and "a second frame" denote a period of one light detection performed by the light detection device 1. "A first frame" is an arbitrary frame of light detection in the light detection device 1.

The row direction reading pixel setting unit 26 and the column direction reading pixel setting unit 36 set, to a pixel group based on information stored in advance, a pixel group for reading signal data in an initial frame after a power source of the light detection device 1 is turned on or next to a frame in which detection of signal data have failed. The pixel group based on information stored in advance will be referred to as a first pixel group, for example. In the present embodiment, the row direction reading pixel setting unit 26 and the column direction reading pixel setting unit 36 set, to a pixel group constituted of all the pixels 11 arranged in the sensor light receiving unit 10, a pixel group for reading signal data in an initial frame after the power source of the light detection device 1 is turned on or next to a frame in which detection of signal data have failed.

In the present embodiment, the row direction reading pixel setting unit 26 sets a pixel group for reading signal data by turning on only the switching elements 23 connected to the wirings 12 reading signal data. The partial reading unit 24 reads signal data through only the wirings 12 connected to the pixel group set by the row direction reading pixel setting unit 26. As a result, signal data is read from the plurality of photosensitive portions 15 included in the pixel group set by the row direction reading pixel setting unit 26.

The binning reading unit 25 may perform binning reading for each of a predetermined number of wirings 12 of the wirings 12 connected to the pixel group set by the row direction reading pixel setting unit 26. When binning reading is not performed, signal data is read for each of the wirings 12. When binning reading is performed by the binning reading unit 25, signal data is collectively read as one piece of signal data for each of a predetermined number of wirings 12.

In the present embodiment, the column direction reading pixel setting unit 36 sets a pixel group for reading signal data by turning on only the switching elements 33 connected to the wirings 13 reading signal data. The partial reading unit 34 reads signal data through only the wirings 13 connected to the pixel group set by the column direction reading pixel setting unit 36. As a result, signal data is read from the plurality of photosensitive portions 16 included in the pixel group set by the column direction reading pixel setting unit 36.

The binning reading unit 35 may perform binning reading for each of a predetermined number of wirings 13 of the wirings 13 connected to the pixel group set by the column direction reading pixel setting unit 36. When binning reading is not performed, signal data is read for each of the wirings 13. When binning reading is performed by the binning reading unit 35, signal data is collectively read as one piece of signal data for each of a predetermined number of wirings 13.

The row direction reading pixel setting unit 26 has a computation unit 41, a determination unit 42, a dividing unit 43, and a comparison unit 44 as functional units. The column direction reading pixel setting unit 36 has a computation unit 51, a determination unit 52, a dividing unit 53, and a comparison unit 54 as functional units.

Each of FIGS. 4 and 5 illustrates signal data read through at least some of the plurality of wirings 12 or the plurality of wirings 13, that is, a profile. The computation unit 41 computes, from the foregoing signal data, feature amounts such as a centroid position Mpx of signal data, a peak position Px, a profile width Wx of signal data, a brightness Ix at a peak position, and the like, illustrated in FIG. 4. The computation unit 51 computes, from the foregoing signal data, feature amounts such as a centroid position Mpy of signal data, a peak position Py, a profile width Wy of signal data, a brightness Iy at a peak position, and the like, illustrated in FIG. 5. Accordingly, in the row direction and the column direction, each of the computation units 41 and 51 computes the incident position of a spot of light in the sensor light receiving unit 10, that is, regions irradiated with the spot of light in the sensor light receiving unit 10. The incident position of the spot of light in the sensor light receiving unit 10 may be computed outside the light detection device 1 based on the feature amounts described above.

In the present embodiment, the computation unit 41 computes the centroid position Mpx in the signal data described above. The computation unit 51 computes the centroid position Mpy in the signal data described above. The centroid position Mpx is a centroid position in signal data projected in the row direction through at least some of the plurality of wirings 12. The centroid position Mpy is a centroid position in signal data projected in the column direction through at least some of the plurality of wirings 13. There is concern that the computed centroid positions Mpx and Mpy may not strictly coincide with actual positions of the pixels 11 which are physically disposed. For this reason, the computation units 41 and 51 may output positions approximating the centroid positions computed from the signal data described above. For example, the positions of the pixels 11 closest to the computed centroid positions may be output as the centroid positions Mpx and Mpy. The computation units 41 and 51 may output the peak positions Px and Py, at which the values of the pixels have the maximum brightness, as the centroid positions Mpx and Mpy. The value of the pixel is a brightness, for example. The maximum brightness is a maximal value, for example.

The determination units 42 and 52 determine a pixel group for reading signal data in the second frame subsequent to the first frame based on the signal data read in the first frame. The pixel group determined by the determination unit 42 is set by the row direction reading pixel setting unit 26 as a pixel group for reading signal data in the second frame. The pixel group determined by the determination unit 52 is set by the column direction reading pixel setting unit 36 as a pixel group for reading signal data in the second frame. In the present embodiment, the row direction reading pixel setting unit 26 turns on the switching elements 23 corresponding to the pixel group with reference to the pixel group determined by the determination unit 42. The column direction reading pixel setting unit 36 turns on the switching elements 33 corresponding to the pixel group with reference to the pixel group determined by the determination unit 52.

The determination unit 42 determines a pixel group connected to some wirings 12 of the plurality of wirings 12 as the pixel group for reading signal data in the second frame. The determination unit 52 determines a pixel group connected to some wirings 13 of the plurality of wirings 13 as the pixel group for reading signal data in the second frame. The pixel group connected to some wirings 12 and 13 of the plurality of wirings 12 and the plurality of wirings 13 will be referred to as second pixel group, for example. The determination unit 42 determines, as the pixel group for reading signal data in the second frame, the pixel group arranged in as many regions as the number of pixels determined in advance in the row direction and the column direction, centering on the centroid position Mpx of signal data computed by the computation unit 41, for example. The determination unit 52 determines, as the pixel group for reading signal data in the second frame, the pixel group arranged in as many regions as the number of pixels determined in advance in the row direction and the column direction, centering on the centroid position Mpy of signal data computed by the computation unit 51, for example.

Figure 6:
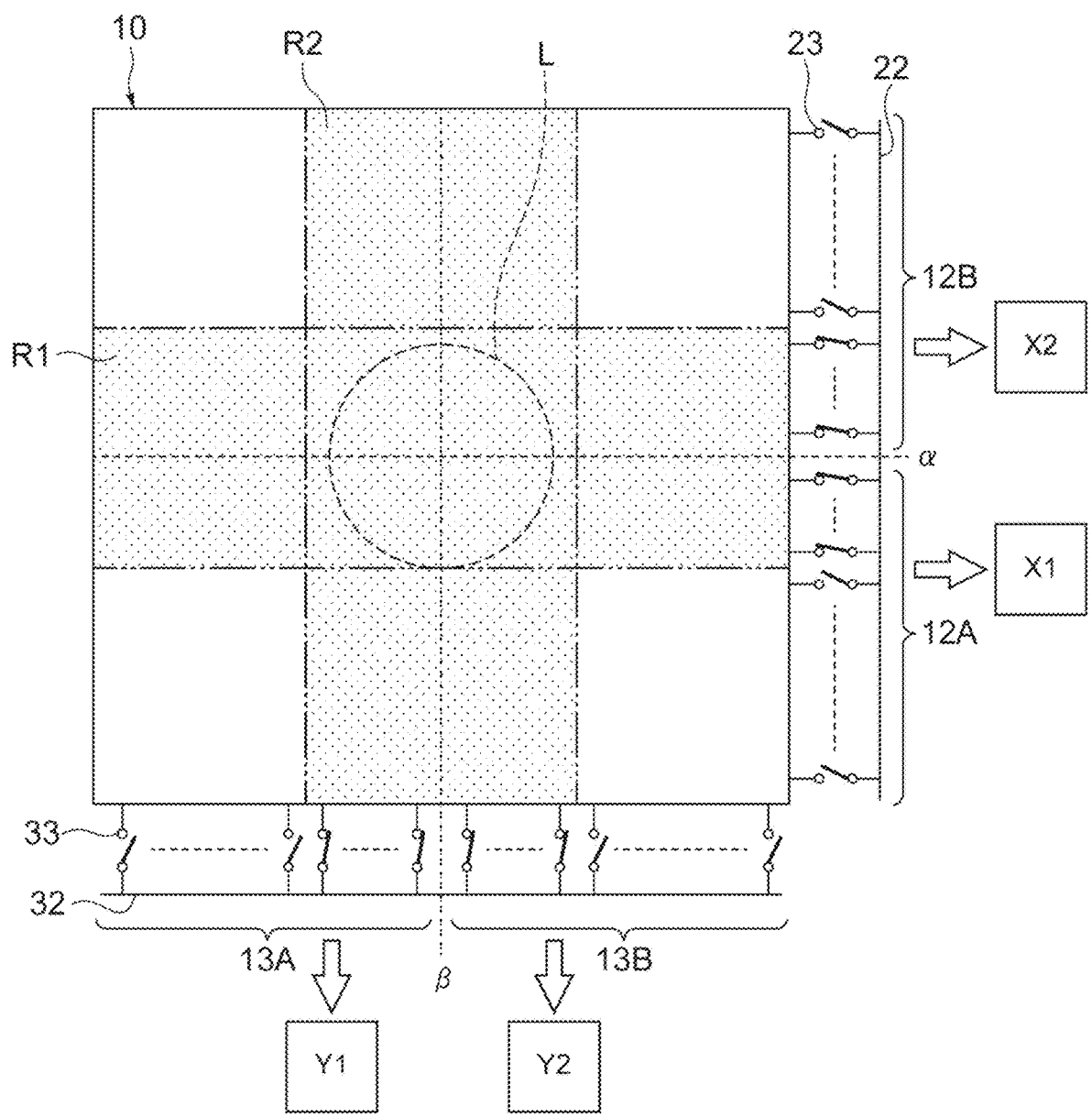
FIG. 6 is a view illustrating partial reading and binning reading of signal data performed by the light detection device.

For example, as illustrated in FIG. 6, the determination unit 42 determines the pixel group disposed in a region R1 as the pixel group for reading signal data in the second frame by the row direction reading unit 21. The partial reading unit 24 reads signal data through only the wirings 12 connected to the photosensitive portions 15 of the pixel group disposed in the region R1 in the second frame. In FIG. 6, the region R1 and a region R2 are illustrated with dot-hatching.

The determination unit 52 determines the pixel group arranged in the region R2 as the pixel group for reading signal data in the second frame by the column direction reading unit 31. In the second frame, the partial reading unit 34 reads signal data through only the wirings 13 connected to the photosensitive portions 15 of the pixel group arranged in the region R2. In the second frame, binning reading in the pixel group determined by the determination units 42 and 52 may be performed by the binning reading units 25 and 35 together with partial reading.

The dividing units 43 and 53 divides the pixel group for reading signal data in the second frame into a plurality of groups by partitioning regions in which the plurality of pixels 11 are arranged into a plurality of regions. In the present embodiment, the dividing unit 43 divides the pixel group for reading signal data in the second frame into a plurality of groups in accordance with the wirings 12 connected to the respective pixels 11, based on the signal data read in the first frame. The dividing unit 53 divides the pixel group for reading signal data in the second frame into a plurality of groups in accordance with the wirings 13 connected to the respective pixels 11, based on the signal data read in the first frame. That is, the pixels 11 connected to the same wirings 12 and 13 are divided into the same group.

For example, as illustrated in FIG. 6, based on the computation results computed by the computation units 41 and 51, the dividing units 43 and 53 divide the pixel group for reading signal data in the second frame into four groups by partitioning the regions in which the plurality of pixels 11 are arranged into four regions. In the configuration illustrated in FIG. 6, the pixel group for reading signal data in the second frame is divided into four groups by dividing each of the plurality of wirings 12 and the plurality of wirings 13 into two groups. In the present embodiment, the dividing unit 43 obtains a division position α from the centroid position Mpx of signal data computed by the computation unit 41. The dividing unit 53 obtains a division position β from the centroid position Mpy of signal data computed by the computation unit 51. The dividing units 43 and 53 partition the regions in which the plurality of pixels 11 are arranged into four regions in accordance with the division positions α and β. In the present embodiment, the division position α is parallel to the row direction, and the division position β is parallel to the column direction.

In the configuration illustrated in FIG. 6, the dividing unit 43 divides the pixel group connected to the plurality of wirings 12 into a group 12A and a group 12B with reference to the division position α. The dividing unit 53 divides the pixel group connected to the plurality of wirings 13 into a group 13A and a group 13B with reference to the division position β. The groups to be divided off by the dividing units 43 and 53 may be determined in advance.

The partial reading units 24 and 34 performs partial reading for each of the groups divided off by the dividing units 43 and 53. For example, the partial reading unit 24 reads signal data X1 from the group 12A on one side connected to the plurality of wirings 12 and reads signal data X2 from the group 12B on the other side connected to the plurality of wirings 12. The partial reading unit 34 reads signal data Y1 from the group 13A on one side connected to the plurality of wirings 13 and reads signal data Y2 from the group 13B on the other side connected to the plurality of wirings 13.

In the example illustrated in FIG. 6, the pixel group for reading signal data by the determination units 42 and 52 are determined as the pixel group arranged in the regions R1 and R2. For this reason, the partial reading unit 24 reads the signal data X1 from the pixel group arranged in the region R1 among the group 12A on one side connected to the plurality of wirings 12. The partial reading unit 24 reads the signal data X2 from the pixel group arranged in the region R2 among the group 12B on the other side. The partial reading unit 34 reads the signal data Y1 from the pixel group arranged in the region R1 among the group 13A on one side connected to the plurality of wirings 13. The partial reading unit 34 reads the signal data Y2 from the pixel group arranged in the region R2 of the group 13B on the other side.

The binning reading units 25 and 35 may read signal data by compiling information of signals output from the wirings 12 or the wirings 13 into one signal for each of the groups divided off by the dividing units 43 and 53. For example, the binning reading unit 25 may read information of signals output from the group 12A as the signal data X1 by compiling the information into one signal and read information of signals output from the group 12B as the signal data X2 by compiling the information into one signal.

Figure 7:
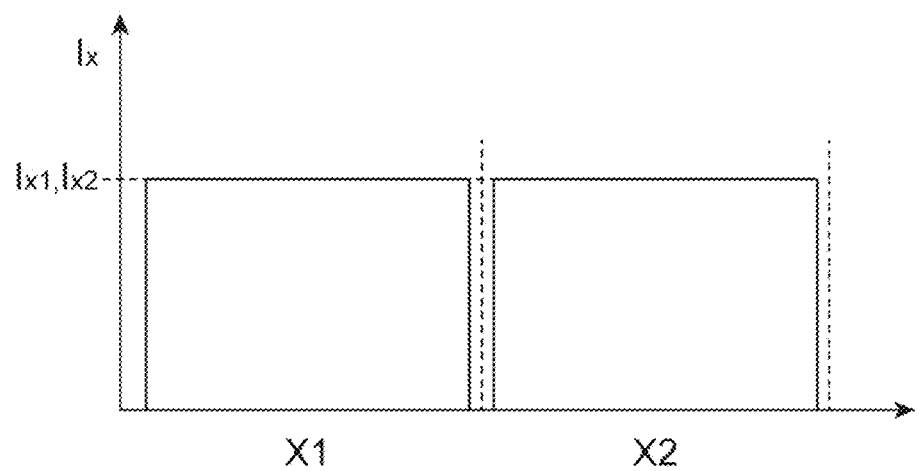
FIG. 7 is a view illustrating signal data read through binning reading.
Figure 8:
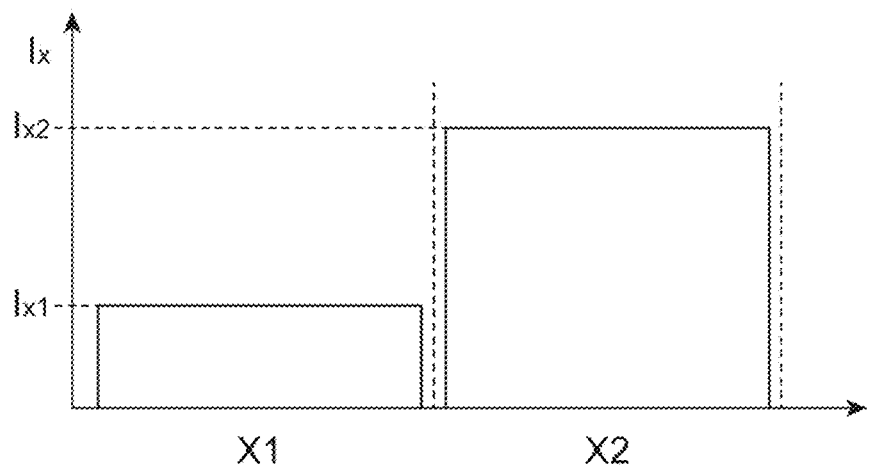
FIG. 8 is a view illustrating signal data read through binning reading.

For example, the binning reading unit 35 may read information of signals output from the group 13A as the signal data Y1 by compiling the information into one signal and read information of signals output from the group 13B as the signal data Y2 by compiling the information into one signal. In this case, for example, the signal data X1 and the signal data X2 read from the binning reading unit 25 can be easily compared as illustrated in FIGS. 7 and 8.

The comparison units 44 and 54 compare signal data read from each of the groups between the groups divided off by the dividing units 43 and 53. For example, as comparison results, the comparison units 44 and 54 obtain comparison values Out(x) and Out(y) by comparing signal data read from each of the groups. In the present embodiment, the comparison units 44 and 54 compare signal data read through binning reading from each of the groups. The comparison units 44 and 54 are constituted of AD converters, voltage comparison circuits, or the like.

In the present embodiment, the signal data X1 subjected to binning reading from the group 12A and the signal data X2 subjected to binning reading from the group 12B are input to the comparison unit 44. The signal data Y1 subjected to binning reading from the group 13A and the signal data Y2 subjected to binning reading from the group 13B are input to the comparison unit 54. For example, when the signal data X1 and the signal data X2 are input, the comparison unit 44 obtains the comparison value Out(X) by the following expression. Here, the factors Ix1 and Ix2 in the following expression respectively indicate brightness values in the signal data X1 and signal data X2.

$$Out(X)=(Ix1-Ix2)/(Ix1+Ix2)$$

When light is evenly incident on the pixel group of the group 12A and the pixel group of the group 12B, as illustrated in FIG. 7, the brightness value Ix1 in the signal data X1 and the brightness value Ix2 in the signal data X2 are equal to each other. In this case, Out(X)=0 is derived as a comparison result. When the incident position of a spot of light is displaced to the group 12B side, that is, in the column direction, as illustrated in FIG. 8, the brightness value Ix2 in the signal data X2 is larger than the brightness value Ix1 in the signal data X1. In this case, Out(X)<0 is derived as a comparison result, and the displacement of the incident position is detected.

When the signal data Y1 and the signal data Y2 are input, the comparison unit 54 obtains the comparison value Out(Y) by the following expression. Here, the factors Iy1 and Iy2 in the following expression respectively indicate brightness values in the signal data Y1 and signal data Y2.

$$Out(Y)=(Iy1-Iy2)/(Iy1+Iy2)$$

When light is evenly incident on the pixel group of the group 13A and the pixel group of the group 13B, the brightness value Iy1 in the signal data Y1 and the brightness value Iy2 in the signal data Y2 are equal to each other. In this case, Out(Y)=0 is derived as a comparison result. When the incident position of a spot of light is displaced to the group 12B side (in the column direction), the brightness value Iy2 in the signal data Y2 is larger than the brightness value Iy1 in the signal data Y1. In this case, Out(Y)<0 is derived as a comparison result, and the displacement of the incident position is detected.

In the present embodiment, the comparison units 44 and 54 derive amounts of change over time between frames in the comparison values Out(X) and Out(Y) and output the amounts of change over time in the comparison values together with the comparison values Out(X) and Out(Y). A displacement amount of the incident position of a spot of light in the column direction is derived from the output of the comparison value Out(X) or the amount of change over time in the comparison value Out(X). Similarly, a displacement amount of the incident position of the spot of light in the row direction is derived from the outputs of the comparison value Out(Y) or the amount of change over time in the comparison value Out(Y).

As described above, the computation units 41 and 51 compute the feature amounts such as the centroid positions Mpx and Mpy of signal data, the peak positions Px and Py, the profile widths Wx and Wy of the foregoing signal data, and the brightnesses Ix and Iy at the peak positions from the signal data described above. The dividing units 43 and 53 divide each of a pixel group connected to the plurality of wirings 12 and a pixel group connected to the plurality of wirings 13 into two group from the computation results computed by the computation units 41 and 51. Therefore, the displacement amounts of the incident position of a spot of light derived from the comparison values Out(X) and Out(Y) of the comparison units 44 and 54 are displacement amounts from the incident position of the spot of light computed by the computation units 41 and 51. Accordingly, a current incident position is detected from the relationship between the incident positions computed by the computation units 41 and 51.

Figure 9:
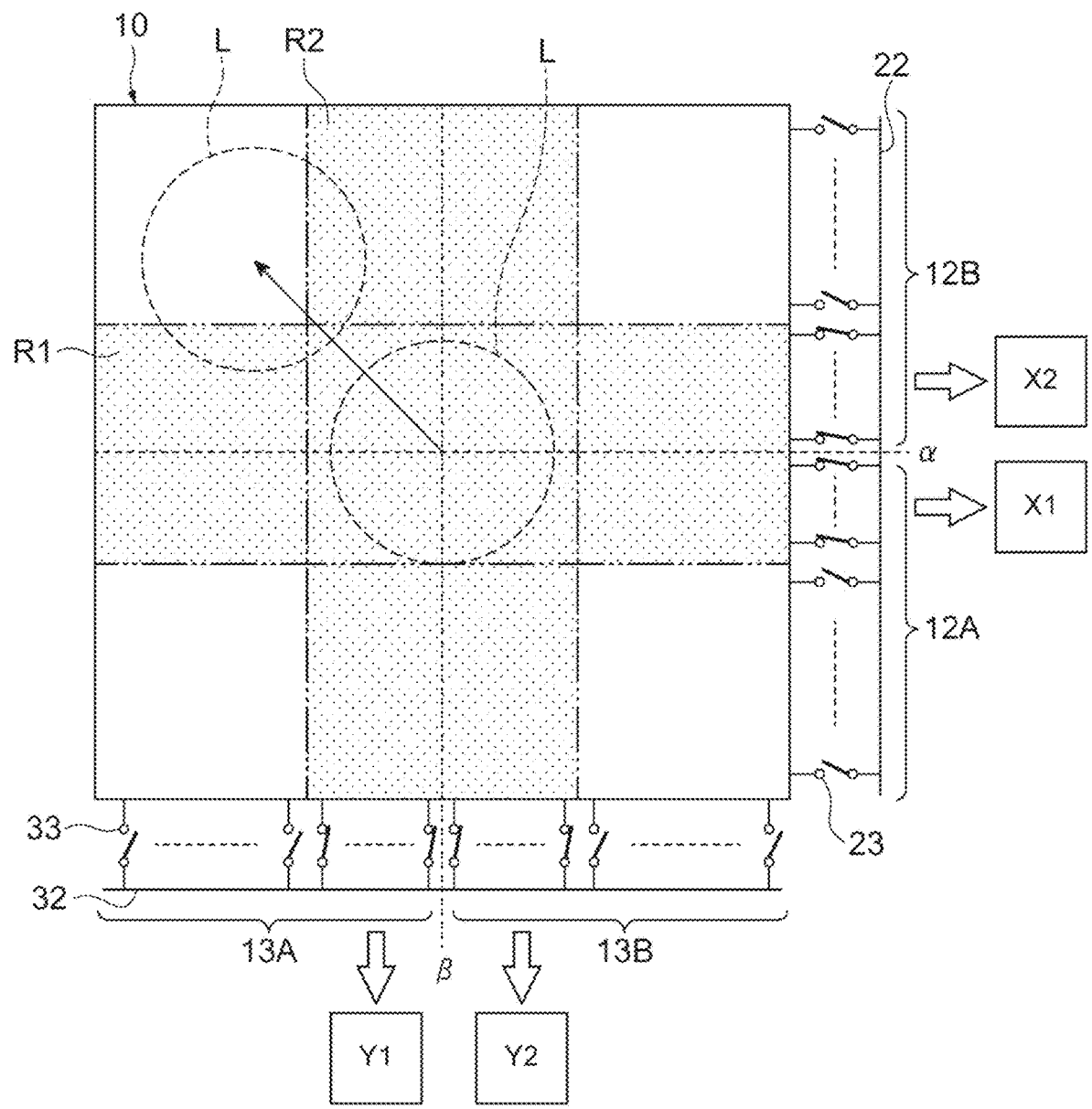
FIG. 9 is a view illustrating processing when a spot of light has moved.

When the comparison value Out(X) or the amount of change over time in the comparison value Out(X) exceeds a predetermined value, for example, a threshold Thx (including ±Thx), the comparison unit 44 updates the threshold Thx. When the comparison value Out(Y) or the amount of change over time in the comparison value Out(Y) exceeds a predetermined value, for example, a threshold Thy (including ±Thy), the comparison unit 54 updates the threshold Thy. The thresholds Thx and Thy may be arbitrary values set in advance by a user or may be obtained from the feature amounts such as the comparison values Out(X) and Out(Y), the detected brightnesses, the peak positions, and the profile widths. In the present embodiment, as illustrated in FIG. 9, the thresholds Thx and Thy are set to values indicating that the center of the spot of incident light L has deviated from the pixel group for reading signal data in a preceding frame. In FIG. 9, the region R1 and the region R2 are illustrated with dot-hatching.

The determination units 42 and 52 determine a pixel group for reading signal data in a succeeding frame, for example, the second frame based on the comparison values Out(X) and Out(Y) in the comparison units 44 and 54 or the amounts of change over time in the comparison values Out(X) and Out(Y). In the present embodiment, the determination unit 42 determines a pixel group for performing reading in the next frame in accordance with the displacement amount of the incident position obtained from the amount of change over time in the comparison value Out(X) of the comparison unit 44. The determination unit 52 determines a pixel group for performing reading in the next frame in accordance with the displacement amount of the incident position obtained from the amount of change over time in the comparison value Out(Y) of the comparison unit 54. That is, the determination units 42 and 52 change the pixel group for performing reading in accordance with the displacement of the incident position of a detected spot of light and newly determine a pixel group for performing reading in the next frame.

Figure 10:
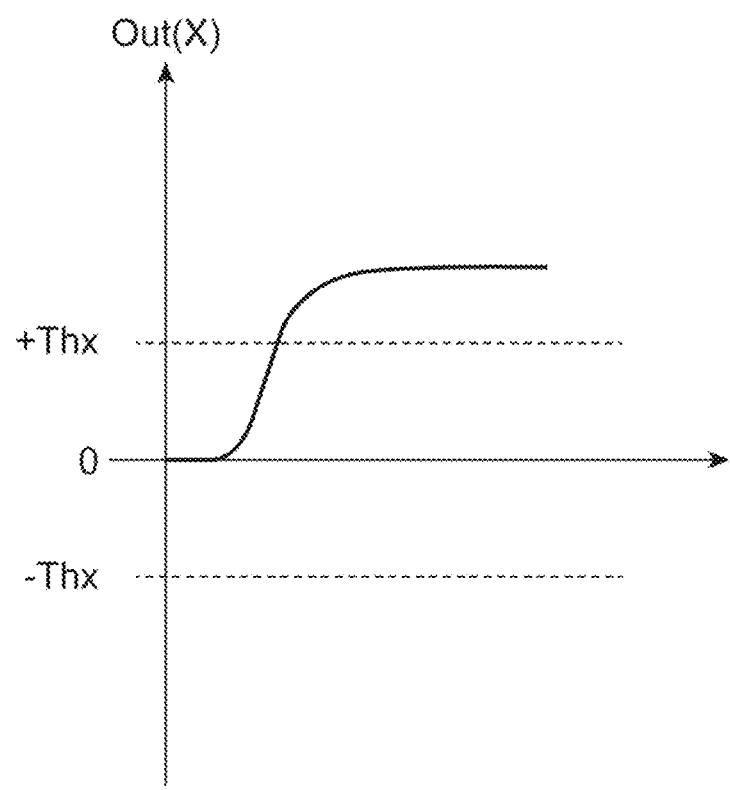
FIG. 10 is a view illustrating a relationship between a comparison value obtained through comparison by a comparison unit and a threshold.

When the comparison values Out(X) and Out(Y) or the amounts of change over time in the comparison values Out(X) and Out(Y) exceed the predetermined values described above, for example, the thresholds Thx and Thy, the determination units 42 and 52 determine a pixel group different from the pixel group which has read signal data in a preceding frame as the pixel group for reading signal data in a succeeding frame, for example, the second frame. Here, a different pixel group indicates that combinations of the pixels 11 constituting a pixel group differ between a preceding frame and a succeeding frame, and also includes a case in which the pixels 11 included in a pixel group overlap in a preceding frame and a succeeding frame. In the present embodiment, as illustrated in FIG. 10, only when the comparison value Out(X) in the comparison unit 44 exceeds the threshold Thx, the determination unit 42 determines a pixel group for reading signal data in the next frame.

Figure 11:
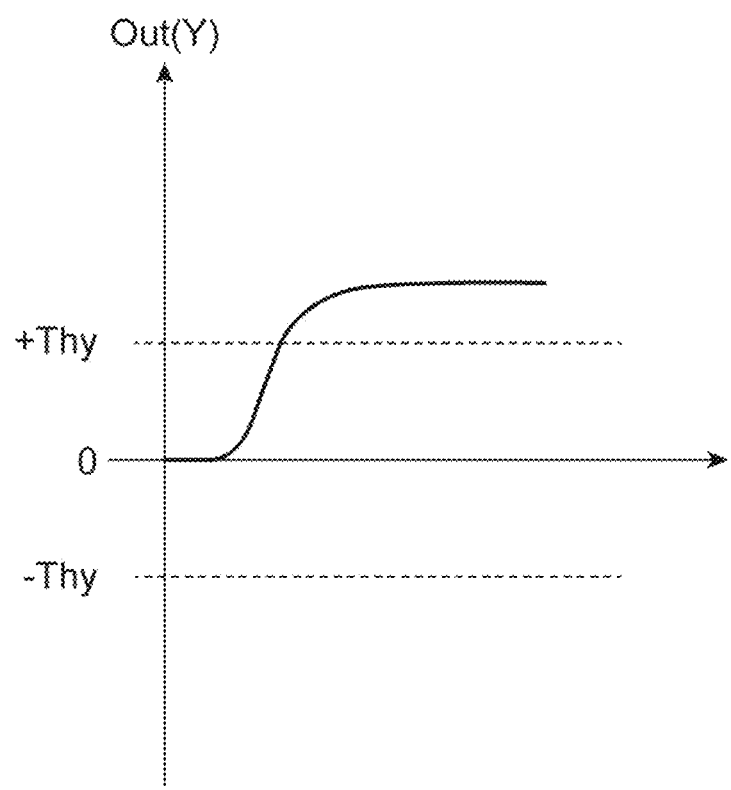
FIG. 11 is a view illustrating a relationship between a comparison value obtained through comparison by the comparison unit and a threshold.

As illustrated in FIG. 11, only when the comparison value Out(Y) of the comparison unit 54 exceeds the threshold Thy, the determination unit 52 determines a pixel group for reading signal data in the next frame. In the present embodiment, when it is determined that the comparison values Out(X) and Out(Y) of the comparison units 44 and 54 respectively exceed the thresholds Thx and Thy, the determination units 42 and 52 determine a pixel group for reading signal data in the next frame as illustrated in FIG. 12.

The dividing units 43 and 53 newly classify the pixel group connected to the plurality of wirings 12 and the pixel group connected to the plurality of wirings 13 into a plurality of groups again based on the comparison values Out(X) and Out(Y) or the amounts of change over time in the comparison values Out(X) and Out(Y) of the comparison units 44 and 54. In the present embodiment, the dividing unit 43 classifies the pixel group connected to the plurality of wirings 12 into two groups again in accordance with the displacement amount of the incident position obtained from the amount of change over time in the comparison value Out(X) of the comparison unit 44. The dividing unit 53 classifies the pixel group connected to the plurality of wirings 13 into two groups again in accordance with the displacement amount of the incident position obtained from the amount of change over time in the comparison value Out(Y) of the comparison unit 54. That is, the dividing units 43 and 53 change the pixel group for performing reading in accordance with the displacement of the incident position of a detected spot of light and newly classify the pixel group for performing reading in the next frame into a plurality of groups again.

In addition, when the comparison values Out(X) and Out(Y) or the amounts of change over time in the comparison values Out(X) and Out(Y) of the comparison units 44 and 54 exceed the predetermined values, for example, the thresholds Thx and Thy, the dividing units 43 and 53 redivide the pixel group connected to the plurality of wirings 12 and the pixel group connected to the plurality of wirings 13. In the present embodiment, as illustrated in FIG. 10, only when the comparison value Out(X) of the comparison unit 44 exceeds the threshold Thx, the dividing unit 43 redivides the pixel group connected to the plurality of wirings 12. As illustrated in FIG. 11, only when the comparison value Out(Y) of the comparison unit 54 exceeds the threshold Thy, the dividing unit 53 redivides the pixel group connected to the plurality of wirings 13.

Figure 12:
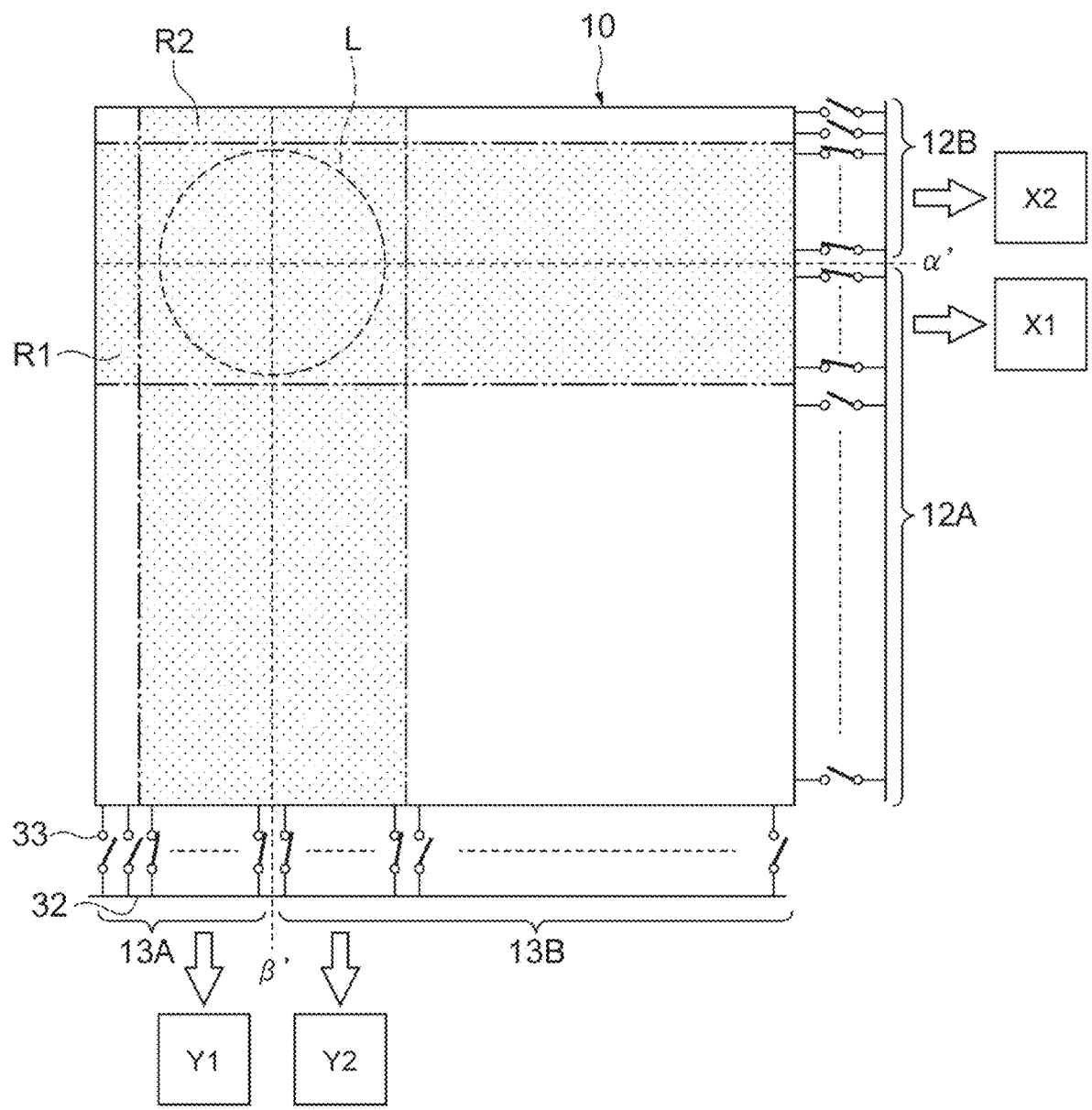
FIG. 12 is a view illustrating processing when a spot of light has moved.

At this time, for example, as illustrated in FIG. 12, the dividing unit 43 divides the pixel group connected to the plurality of wirings 12 in the next frame into two groups 12A and 12B with reference to a division position α' different from the division position α. The dividing unit 53 divides the pixel group connected to the plurality of wirings 13 into two groups 13A and 13B with reference to a division position β' different from the division position β. In FIG. 12, the region R1 and the region R2 are illustrated with dot-hatching.

The partial reading units 24 and 34 and the binning reading units 25 and 35 read signal data from the pixel group determined by the determination units 42 and 52 for each of the groups which have been divided off again by the dividing units 43 and 53. The comparison units 44 and 54 compare the signal data read from each of the groups between a plurality of groups which have been divided off again. In this manner, the row direction reading pixel setting unit 26 and the column direction reading pixel setting unit 36 repeatedly perform processing of the determination units 42 and 52, processing of the dividing units 43 and 53, processing of the partial reading units 24 and 34 and the binning reading units 25 and 35, and processing of the comparison units 44 and 54.

Figure 13:
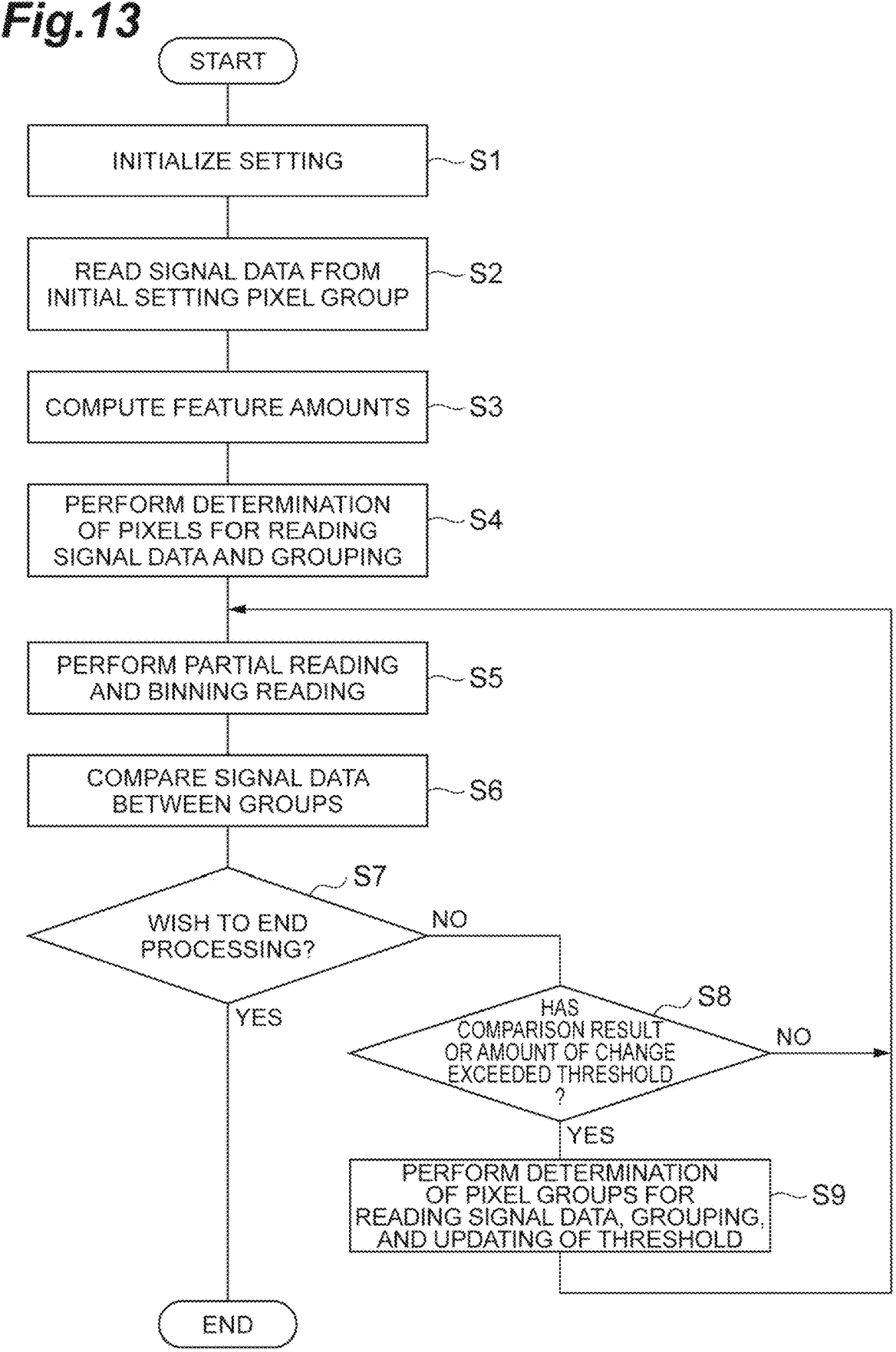
FIG. 13 is a flowchart illustrating processing performed by a reading circuit.

Next, with reference to the flowchart in FIG. 13, a light detection method using the light detection device 1 will be described in detail.

First, the row direction reading unit 21 and the column direction reading unit 31 initialize setting of the pixel group for reading signal data, grouping performed by the dividing units 43 and 53, and the thresholds Thx and Thy using the row direction reading pixel setting unit 26 and the column direction reading pixel setting unit 36 (processing S1). Through the initialization, a pixel group for reading signal data in an initial frame is set to a pixel group based on information stored in advance, that is, an initial setting pixel group. In the present embodiment, the initial setting pixel group is a pixel group constituted of all the pixels 11 arranged in the sensor light receiving unit 10.

Subsequently, the row direction reading unit 21 and the column direction reading unit 31 read the signal data from the initial setting pixel group set in the processing S1 (processing S2). The row direction reading unit 21 reads the signal data projected in the row direction from a signal output through at least some of the plurality of wirings 12. The column direction reading unit 31 reads the signal data projected in the column direction from a signal output through at least some of the plurality of wirings 13. A two-dimensional incident position of a spot of light in the initial frame is detected by these two pieces of signal data.

Subsequently, the row direction reading unit 21 and the column direction reading unit 31 compute the feature amounts of the signal data read in the processing S2 using the computation units 41 and 51 (processing S3). For example, the feature amounts include the centroid positions Mpx and Mpy, the peak positions Px and Py, the profile widths Wx and Wy of the foregoing signal data, and the brightnesses Ix and Iy at the peak positions.

Subsequently, the row direction reading unit 21 and the column direction reading unit 31 perform determination of a pixel group for reading in the next frame and grouping of the pixel group using the determination units 42 and 52 and the dividing units 43 and 53 based on the computation results computed in the processing S2 (processing S4). In the present embodiment, determination of a pixel groups for reading in the next frame and grouping of the pixel group are performed based on the centroid positions Mpx and Mpy computed in the processing S2. The pixel group for reading signal data in the next frame are set to the pixel group determined by the determination units 42 and 52 in the processing S4.

Subsequently, the row direction reading unit 21 and the column direction reading unit 31 read signal data from the pixel group set through the immediately preceding processing for each of the groups divided in the immediately preceding processing using the partial reading units 24 and 34 and the binning reading units 25 and 35 (processing S5). That is, the row direction reading unit 21 and the column direction reading unit 31 read signal data through at least some of the plurality of wirings 12 and the plurality of wirings 13 using the partial reading units 24 and 34 and the binning reading units 25 and 35.

Subsequently, the row direction reading unit 21 and the column direction reading unit 31 compare the signal data read from each of the groups between the groups using the comparison units 44 and 54 (processing S6). The displacement amount of the incident position of the spot of light is derived from the comparison values Out(X) and Out(Y) or the amounts of change over time in the comparison values Out(X) and Out(Y) of the comparison units 44 and 54, and a two-dimensional incident position of the spot of light is detected.

Subsequently, the row direction reading unit 21 and the column direction reading unit 31 determine whether to end the processing (processing S7). When the row direction reading unit 21 and the column direction reading unit 31 have determined to end the processing, the processing is ended.

When the row direction reading unit 21 and the column direction reading unit 31 have determined not to end the processing, it is determined whether or not the comparison values Out(X) and Out(Y) or the amounts of change over time in the comparison values Out(X) and Out(Y) have exceeded the thresholds Thx and Thy (processing S8). When the comparison values Out(X) and Out(Y) or the amounts of change over time in the comparison values Out(X) and Out(Y) have not exceeded the thresholds Thx and Thy, the foregoing processing S5 is performed.

When it is determined that the comparison values Out(X) and Out(Y) or the amounts of change over time have exceeded the thresholds Thx and Thy, the row direction reading unit 21 and the column direction reading unit 31 perform determination of the pixel group for reading signal data in the next frame, grouping of the pixel group, and updating of the thresholds Thx and Thy using the determination units 42 and 52, the dividing units 43 and 53, and the comparison units 44 and 54 (processing S9). The pixel group for reading signal data in the next frame are set to the pixel group determined by the determination units 42 and 52 in the processing S9. Thereafter, the row direction reading unit 21 and the column direction reading unit 31 perform the processing S5. Through the processing described above, two-dimensional incident position of a spot of light are repeatedly detected in a plurality of frames.

As described above, in the light detection device 1, the row direction reading pixel setting unit 26 and the column direction reading pixel setting unit 36 set the pixel group for reading signal data in the second frame from the plurality of pixels 11 based on the signal data read in the first frame. For this reason, in the second frame, the row direction reading unit 21 and the column direction reading unit 31 can read signal data from a pixel group, of the plurality of pixels 11, suitable for detecting an incident position of light based on the signal data read in the first frame. For example, since the number of pixels reading signal data is reduced by performing partial reading in which signal data is read from only the pixels 11 necessary to detect an incident position of light, reading speed can be improved.

In detection devices in the related art, when the number of pixels reading is reduced, the resolution of an incident light spot deteriorates. Therefore, there is a possibility that the position detection accuracy in detecting a position of an incident light spot deteriorates. The position detection accuracy in detecting a position of an incident light spot is rephrased as the accuracy in detecting an incident position of an incident light spot. Meanwhile, in the light detection device 1, the pixel group read based on the signal data read in the first frame are suitably set. Therefore, even when the number of pixels reading signal data is reduced, the position detection accuracy in detecting a position of an incident light spot is maintained. That is, while the position detection accuracy in detecting a position of an incident light spot is ensured, the number of pixels reading can be reduced. If the number of pixels reading is reduced, speed of detecting a position can be improved. Therefore, both ensuring the position detection accuracy in detecting a position of an incident light spot and improving speed of detecting a position can be achieved.

The row direction reading pixel setting unit 26 and the column direction reading pixel setting unit 36 set the pixel group for reading signal data in the first frame to the first pixel group of the plurality of pixels 11, for example, the initial setting pixel group, and set, based on the signal data read in the first frame, the pixel group for reading signal data in the second frame to the second pixel group connected to some of the wirings 12 and 13 of the plurality of wirings 12 and 13 connected to the first pixel group. According to this configuration, the second pixel group are determined based on the signal data in the first frame in which the pixels perform reading from the first pixel group configured to be a region larger than the second pixel group reading signal data in the second frame. Therefore, the position detection accuracy in detecting a position of an incident light spot can be improved.

The row direction reading pixel setting unit 26 and the column direction reading pixel setting unit 36 respectively have the dividing units 43 and 53 which divide the pixel group for reading signal data in the second frame into a plurality of groups by partitioning the regions in which the plurality of pixels 11 are arranged, the comparison units 44 and 54 which compare the signal data read from each of the groups between the groups divided off by the dividing units 43 and 53, and the determination units 42 and 52 which determine the pixel groups reading signal data in the second frame, based on the comparison results of the comparison units 44 and 54. According to this configuration, the pixel groups reading signal data in the second frame are determined based on the comparison results between the divided groups. For this reason, compared to when signal data read from the plurality of wirings 12 and 13 is used for determining a pixel group as it stands without partitioning a region, even when the incident light spot has moved, the pixel group can be easily and quickly determined suitably conforming to the movement thereof.

The row direction reading unit 21 and the column direction reading unit 31 respectively have the binning reading units 25 and 35 which read signal data by compiling information of signals output from the plurality of wirings 12 and 13 in each of the groups into one signal for each of the groups divided off by the dividing units 43 and 53. The comparison units 44 and 54 compare the signal data read by the binning reading units 25 and 35 between the groups. According to this configuration, binning reading in which information of signals output from the plurality of wirings 12 and 13 is collectively read as one piece of signal data for each of the groups is performed. For this reason, while information of the signal data is reflected, reading speed can be improved compared to when the signal data is read from the plurality of wirings 12 and 13 as it stands without being compiled.

The dividing units 43 and 53 classify the pixel group for reading signal data in the second frame into a plurality of groups, based on the comparison results of the comparison units 44 and 54. According to this configuration, compared to when the signal data read from the plurality of wirings 12 and 13 is used for classifying groups as it stands, the position of dividing off a pixel group can be changed easily and quickly conforming to the movement of an incident light spot. If the position of dividing off a pixel group is changed conforming to the movement of an incident light spot, signal data can be compared between groups which are classified easily and accurately.

The dividing units 43 and 53 classify the pixel group for reading signal data in the second frame into a plurality of groups, based on the amounts of change over time in the comparison values Out(X) and Out(Y) obtained through comparison by the comparison units 44 and 54. The determination units 42 and 52 determine the pixel group for reading signal data in the second frame, based on the amounts of change over time. According to this configuration, regarding the position of dividing off a pixel group and the pixel group for reading signal data, compared to when the signal data read from the plurality of wirings 12 and 13 is used as it stands, the pixel group can be changed easily and quickly conforming to the movement of an incident light spot. If the divided position is changed conforming to the movement of the movement of an incident light spot, signal data can be compared between groups which are classified easily and accurately. If the pixel group for reading signal data are changed conforming to the movement of an incident position of light, the position detection accuracy in detecting a position of an incident light spot can be improved.

When the comparison values Out(X) and Out(Y) obtained through comparison by the comparison units 44 and 54 or the amounts of change over time in the comparison values Out(X) and Out(Y) exceed the thresholds Thx and Thy, the dividing units 43 and 53 divide the pixel group for reading signal data in the second frame into a plurality of groups. According to this configuration, since grouping of the pixel group can be performed at an appropriate timing, the frequency of grouping can be reduced. If the frequency of grouping performed by the dividing units 43 and 53 is reduced, processing speed in detecting an incident position of an incident light spot can be improved.

When the comparison values Out(X) and Out(Y) or the amounts of change over time in the comparison values Out(X) and Out(Y) exceed the thresholds Thx and Thy, the determination units 42 and 52 newly determine a pixel group different from a pixel group reading signal data in the first frame as the pixel group for reading signal data in the second frame. According to this configuration, the pixel group for reading signal data can be changed at an appropriate timing. Therefore, while the accuracy of detecting an incident position of an incident light spot is ensured, the frequency of grouping can be reduced. If the frequency of grouping performed by the dividing units 43 and 53 is reduced, processing speed in detecting an incident position of an incident light spot can be improved.

The row direction reading pixel setting unit 26 and the column direction reading pixel setting unit 36 further have the computation units 41 and 51 which compute the centroid positions Mpx and Mpy of the projection data in the row direction of a signal output through at least some of the plurality of wirings 12 and 13. The dividing units 43 and 53 divide the pixel group for reading signal data in the second frame into a plurality of groups by partitioning, based on the division positions α and β obtained from the centroid positions Mpx and Mpy computed by the computation units 41 and 51, regions in which a plurality of pixels are arranged. The determination units 42 and 52 determine the pixel group to be set as the pixel group for reading signal data in the second frame, based on the centroid positions Mpx and Mpy computed by the computation units 41 and 51. In this case, since grouping is performed based on the centroid positions Mpx and Mpy, signal data between groups can be easily compared.

For example, the dividing units 43 and 53 divide, based on the division positions α and β obtained from the centroid positions Mpx and Mpy computed by the computation units 41 and 51, the pixel group connected to the plurality of wirings 12 and 13 into two groups, respectively. In this case, it is assumed that the comparison results of the comparison units 44 and 54 are Out(X)=0 and Out(Y)=0, respectively. For this reason, the displacement amount of the incident position of an incident light spot in the column direction in a frame in which the centroid position Mpx is computed by the computation unit 41 can be simply detected from the comparison value Out(X). Similarly, the displacement amount of the incident position of an incident light spot in the row direction in a frame in which the centroid position Mpy is computed by the computation unit 51 can be simply detected from the comparison value Out(Y).

There is concern that the centroid positions Mpx and Mpy may not strictly coincide with the actual positions of the physically disposed pixels 11. As a result, there is concern that the comparison results of the comparison units 44 and 54 may not become Out(X)=0 and Out(Y)=0 in a frame in which the centroid positions Mpx and Mpy are computed by the computation units 41 and 51. In this case as well, by deriving the amounts of change over time in the comparison values Out(X) and Out(Y), the displacement amounts of the incident position in the row direction and the column direction can be detected from the amounts of change over time.

As described above, the current incident position can be detected based on the displacement amount from the incident position detected in a frame in which computation is performed by the computation units 41 and 51.

The light detection method according to the present embodiment includes a pixel setting step of setting the pixel group for reading signal data in the second frame subsequent to the first frame from the plurality of pixels 11, based on the signal data read through a reading step in the first frame. For this reason, signal data can be read in the second frame from a pixel group, of the plurality of pixels 11, suitable for detecting an incident position of light, based on the signal data read in the first frame. In this case, a pixel group to be read is set based on the signal data read in the first frame. Therefore, even if the number of pixels reading signal data is reduced, the position detection accuracy in detecting a position of an incident light spot can be ensured. If the number of pixels reading is reduced, speed of detecting a position can be improved.

Hereinabove, the embodiment of the present invention has been described. However, the present invention is not necessarily limited to the embodiment described above, and various changes can be made within a range not departing from the gist thereof.

For example, the row direction reading pixel setting unit 26 or the column direction reading pixel setting unit 36 may set the pixel group for reading signal data in next to a predetermined frame, based on the signal data read in the predetermined frame. The computation units 41 and 51, the determination units 42 and 52, the dividing units 43 and 53, and the comparison units 44 and 54 may be provided outside the light detection device 1.

The determination units 42 and 52 may determine the pixel group for reading signal data for each frame. Similarly, the dividing units 43 and 53 may perform redividing for each frame. The thresholds Thx and Thy serving as triggers when determination units 42 and 52 determine the pixel group and the thresholds Thx and Thy serving as triggers when the dividing units 43 and 53 perform redividing may be different values.

The determination units 42 and 52 may determine the pixel group when conditions different from those of the thresholds Thx and Thy are satisfied. The dividing units 43 and 53 may perform redividing when conditions different from those of the thresholds Thx and Thy are satisfied. As an example of the different conditions described above, for instance, a state in which no spot of light is detected in one group of the groups divided off by the dividing units 43 and 53 while the comparison values Out(X) and Out(Y) do not exceed the thresholds Thx and Thy may be adopted as a condition. A condition for a trigger when the determination units 42 and 52 perform determination of the pixel group and a condition for a trigger when the dividing units 43 and 53 perform redividing may be different conditions.

In the present embodiment, the row direction reading unit 21 and the column direction reading unit 31 read signal data by dividing the plurality of wirings 12 and the plurality of wirings 13 over time. However, signal data from the plurality of wirings 12 and the plurality of wirings 13 may be divided and read in parallel at the same time. For example, the partial reading unit 24 may read the signal data X1 and the signal data X2 in parallel at the same time, and the partial reading unit 34 may read the signal data Y1 and the signal data Y2 in parallel at the same time.

REFERENCE SIGNS LIST

1 Light detection device
11 Pixel
12, 13 Wiring
12A, 12B, 13A, 13B Group
15, 16 Photosensitive portion
21 Row direction reading unit
31 Column direction reading unit
26 Row direction reading pixel setting unit
36 Column direction reading pixel setting unit
41, 51 Computation unit
42, 52 Decision unit
43, 53 Dividing unit
44, 54 Comparison unit
X, Y, X1, X2, Y1, Y2 Signal data
Out(X), Out(Y) Comparison value
Thx, Thy Threshold
α, β Division position

The invention claimed is:

1. A light detection device detecting an incident position of light, the light detection device comprising:
a plurality of pixels arranged two-dimensionally in a matrix and individually including a first photosensitive portion and a second photosensitive portion;
a plurality of first wirings connecting a plurality of the first photosensitive portions to each other for every row;
a plurality of second wirings connecting a plurality of the second photosensitive portions to each other for every column;
a first reading unit arranged to read signal data through at least some of the plurality of first wirings; and
a second reading unit arranged to read signal data through at least some of the plurality of second wirings,
wherein the first reading unit has a reading pixel setting unit arranged to set, based on signal data read in a first frame, a pixel group for reading signal data in a second frame subsequent to the first frame from the plurality of pixels, and
wherein the reading pixel setting unit has
a dividing unit arranged to divide the pixel group reading signal data in the second frame into a plurality of groups by partitioning lions in which the plurality of pixels are arranged,
a comparison unit arranged to compare signal data read from each of the groups between the groups divided off by the dividing unit, and
a determination unit arranged to determine the pixel group for reading signal data in the second frame, based on comparison results of the comparison unit.

2. The light detection device according to claim 1, wherein the reading pixel setting unit is arranged to set a pixel group for reading signal data in the first frame to a first pixel group of the plurality of pixels, and to set, based on the signal data read in the first frame, a pixel group for reading signal data in the second frame to a second pixel group connected to some first wirings of the plurality of first wirings connected to the first pixel group.

3. The light detection device according to claim 1, wherein the first reading unit has a binning reading unit arranged to read signal data by compiling information of signals output from the plurality of first wirings in each of the groups into one signal for each of the groups divided off by the dividing unit, and
wherein the comparison unit is arranged to compare signal data read by the binning reading unit between the groups.

4. The light detection device according to claim 1, wherein the dividing unit is arranged to divide the pixel group for reading signal data in the second frame into a plurality of groups, based on comparison results of the comparison unit.

5. The light detection device according to claim 1, wherein the dividing unit is arranged to divide the pixel group for reading signal data in the second frame into a plurality of groups, based on an amount of change over time in a comparison value obtained through comparison by the comparison unit, and
wherein the determination unit is arranged to determine the pixel group reading signal data in the second frame, based on the amount of change over time.

6. The light detection device according to claim 1, wherein the dividing unit is arranged to divide the pixel group for reading signal data in the second frame into a plurality of groups when a comparison value obtained through comparison by the comparison unit or an amount of change over time in the comparison value exceeds a predetermined value.

7. The light detection device according to claim 1, wherein the determination unit is arranged to determine a pixel group different from a pixel group for reading signal data in a preceding frame of the second frame as the pixel group for reading signal data in the second frame when a comparison value obtained through comparison by the comparison unit or an amount of change over time in the comparison value exceeds a predetermined value.

8. The light detection device according to claim 1, wherein the reading pixel setting unit further has a computation unit arranged to compute a centroid position of signal data projected in a row direction or a column direction of signals output through at least some of the plurality of first wirings, wherein the dividing unit is arranged to divide the pixel group for reading signal data in the second frame into a plurality of groups by partitioning, based on the centroid position computed by the computation unit, regions in which the plurality of pixels are arranged, and wherein the determination unit is arranged to determine a pixel group to be set as the pixel group for reading signal data in the second frame, based on the centroid position computed by the computation unit.

9. A light detection method comprising:

using a light detection device including a plurality of pixels arranged two-dimensionally in a matrix and individually including a first photosensitive portion and a second photosensitive portion, a plurality of first wirings connecting a plurality of the first photosensitive portions to each other for every row, and a plurality of second wirings connecting a plurality of the second photosensitive portions to each other for every column;

reading signal data projected in a row direction from signals output through at least some of the plurality of first wirings;

reading signal data projected in a column direction from signals output through at least some of the plurality of second wirings;

detecting a two-dimensional incident position of light from two pieces of the signal data read, wherein the two pieces of signal data are read through at least some of the plurality of first wirings in a plurality of frames, and wherein a pixel group for reading a signal data in a second frame subsequent to a first frame is set from the plurality of pixels, based on signal data read in the first frame, dividing the pixel group for reading signal data in the second frame into a plurality of groups by partitioning regions in which the plurality of pixels arranged;

comparing signal data read from each of the groups; and determining the pixel group for reading signal data in the second frame, based on comparison results.

* * * * *